United States Patent Office 2,931,839
Patented Apr. 5, 1960

2,931,839

3,3,3-TRICHLORO-2-ALKYL-2-NITROPROPANOLS AND METHOD FOR PREPARATION THEREOF

Donald G. Kundiger and Gene F. Morris, Manhattan, Kans., assignors to The Dow Chemical Company, Midland, Mich., a corporation of Delaware No Drawing. Application October 6, 1958
Serial No. 765,293

4 Claims. (Cl. 260—633)

The present invention is concerned with 3,3,3-trichloro-2-alkyl-2-nitropropanols represented by the formula

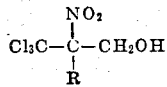

In this and succeeding formulae, R represents a lower alkyl radical containing from 1 to 4 carbon atoms, inclusive. More specifically the invention is concerned with new methods for preparing 3,3,3-trichloro-2-alkyl-2-nitropropanols and embraces new compounds prepared in accordance with this invention, particularly 3,3,3-trichloro-2-methyl-2-nitropropanol.

Trichloronitropropanols are useful as parasiticides such as for the control of nematodes, bacteria and fungi. They are also useful as herbicides, particularly for the control of aquatic plants.

Trichloronitropropanols are crystalline white solids, soluble in organic solvents such as alcohol chlorinated hydrocarbons and aliphatic nitro alcohols; dilute aqueous sodium hydroxide, sodium bicarbonate and hydrochloric acid solution; and substantially insoluble in water.

According to this invention, 3,3,3-trichloro-2-alkyl-2-nitropropanols may be prepared by the reaction of 3,3-dichloro-2-alkylallyl alcohol having the structure $$Cl_2C=C-CH_2OH$$
$$\quad |$$
$$\quad R$$

with a nitrogen oxide oxidizing agent. By "nitrogen oxide oxidizing agent" is meant dinitrogen tetroxide ($N_2O_4$) or concentrated nitric acid.

The reaction appears to take place by a free radical mechanism with the third chlorine atom of the product originating from another molecule of the reactant. The by-products in the reaction include material resulting from the dechlorination of the reactant 3,3-dichloro-2-alkylallyl alcohol.

The preferred method for the preparation of the 3,3,3-trichloro-2-alkyl-2-nitropropanols is by oxidizing the corresponding 3,3-dichloro-2-alkylallyl alcohol with dinitrogen tetroxide. Good results are obtained when an equimolar proportion or a slight excess of the dinitrogen tetroxide is employed for each molar proportion of the 3,3-dichloro-2-alkylallyl alcohol. The reaction is carried out in a suitable solvent such as carbon tetrachloride or ethylene dichloride. The reaction takes place in the temperature range of from about $-50°$ C. to $25°$ C. It is preferred, however, that the initial reaction temperature be well below $0°$ C. The time usually required to complete the reaction to obtain the desired 3,3,3-trichloro-2-alkyl-2-nitropropanol is from about 12 to 30 hours.

In carrying out the reaction, 3,3-dichloro-2-alkylallyl alcohol and dinitrogen tetroxide are mixed together in a suitable solvent at a temperature of about $-50°$ C. The mixture is maintained below $0°$ C. for a period of about 8 to 12 hours and thereafter allowed to warm to a temperature in the range of from $15°$ C. to $30°$ C. The reaction mixture is maintained at the latter temperature from about 12 hours to 20 hours. Thereafter, the unreacted dinitrogen tetroxide and solvent are removed by vaporization and the desired 3,3,3-trichloro-2-alkyl-2-nitropropanol recovered as residue. The product may be purified by recrystallization.

In an alternative method for preparing 3,3,3-trichloro-2-alkyl-2-nitropropanols, the corresponding 3,3-dichloro-2-alkyllalyl alcohol is oxidized with concentrated nitric acid. Good results are obtained when a molar excess of the concentrated nitric acid is employed for each molar proportion of the alcohol. The reaction takes place in the temperature range of from about $-5°$ C. to $30°$ C. It is desirable to carry out the reaction at an initial temperature in the range of from $-5°$ C. to $10°$ C. to moderate the vigor of the reaction and to subsequently increase the temperature to a maximum of about $30°$ C. The reaction is generally complete in from one to three hours after the reactants are mixed together.

In carrying out the reaction by the second procedure, the appropriate 3,3-dichloro-2-alkylallyl alcohol is added portionwise to aqueous concentrated nitric acid maintained in the temperature range of from about $-5°$ C. to about $10°$ C. A reaction takes place during the addition with the evolution of nitrogen oxide and nitrogen dioxide gases. After completion of the addition, the reaction mixture may be allowed to warm gradually to about $25°$ to $30°$ C. Thereafter, the nitrogen oxide gases still remaining in the reaction mixture are removed by any one or a combination of the following procedures: (1) alternately cooling and warming between the temperatures of about $12°$ C. and $30°$ C., (2) subjecting the reaction mixture to a reduced pressure of from 10 to 20 millimeters of mercury, or (3) bubbling nitrogen gas through the reaction mixture. After the removal of the nitrogen oxide gases is substantially complete, the reaction mixture is treated with an alkali metal bicarbonate solution to render the reaction mixture substantially neutral. The organic portion is separated from the aqueous portion according to conventional procedures. The organic portion is then heated to distill out low-boiling by-products and to obtain the desired 3,3,3-trichloro-2-methyl-2-nitropropanol product as a white solid residue. The latter is fractionally crystallized from a chlorinated hydrocarbon solvent to obtain a purified product. The product may be further purified, if desired, by procedures known to those skilled in the art.

The following examples illustrate the invention but are not to be construed as limiting.

*Example 1.—3,3,3-trichloro-2-methyl-2-nitropropanol*

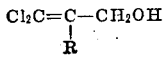

100 grams (0.7 mole) of 3,3-dichloro-2-methylallyl alcohol (precooled to $-10°$ C.) was added to a solution of 70 grams (0.76 mole) of dinitrogen tetroxide in 200 milliliters of chloroform, previously cooled to $-50°$ C. in a Dry Ice-chloroform bath. The reaction mixture was allowed to stand overnight in the cooling bath during which time the solution warmed to $-11°$ C. The mixture was then allowed to warm to room temperature and maintained at that temperature for 16 hours. Thereafter, excess dinitrogen tetroxide and chloroform solvent were removed by vaporization under normal-water-pump vacuum pressure and to obtain as a white solid residue 100 grams of a 3,3,3-trichloro-2-methyl-2-nitropropanol product. The latter on recrystallization from carbon tetrachloride had a melting point of 195°–196° C. The product had elemental analyses as follows:

|  | C | H | N | Cl |
|---|---|---|---|---|
| Calculated | 21.6 | 2.7 | 6.3 | 47.8 |
| Found | 22.2 | 2.8 | 6.2 | 47.7 |

The product was further identified by acetylation to obtain 3,3,3-trichloro-2-methyl-2-nitropropyl acetate having the structure

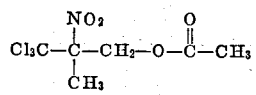

The acetate had elemental analyses as follows:

|  | C | H | N | Cl |
|---|---|---|---|---|
| Calculated | 27.3 | 3.0 | 5.3 | 40.2 |
| Found | 27.8 | 3.3 | 5.9 | 39.0 |

*Example 2.—3,3,3-trichloro-2-methyl-2-nitropropanol*

141 grams (1.0 mole) of 3,3-dichloro-2-methylallyl alcohol was added portionwise to 130 milliliters (2.0 moles) of aqueous 70 percent nitric acid (specific gravity 1.42). The nitric acid solution was cooled to −3° C. prior to the addition and the reaction mixture maintained in the temperature range of between −3° to +2° C., during the addition of about 90 percent of the 3,3-dichloro-2-methylallyl alcohol. An exothermic reaction took place during the addition with the evolution of nitrogen oxide and nitrogen dioxide gases. Thereafter the reaction mixture was allowed to warm to about 14° C. over a period of 1 hour. There was continued evolution of the nitrogen oxide gases. The mixture was then cooled to 5° C. and the remaining alcohol added portionwise over a period of about 1 hour while the temperature was maintained between 0° and 5° C. After completion of the addition, the mixture was alternately warmed to 25° C. and cooled to 15° C. several times to facilitate the removal of the nitrogen oxide gases. Thereafter the mixture was placed under water pump vacuum pressure for a period of about 15 minutes. Nitrogen was then bubbled through the mixture at 50° C. to sweep out the remaining nitrogen oxide gases. Following this the mixture was treated with sodium bicarbonate to assure neutralization of the reaction mixture. The organic and aqueous portions were separated. The organic portion was washed with sodium bicarbonate and then distilled to remove low boiling by-products and to obtain a white solid residue. The latter was fractionally crystallized from carbon tetrachloride to obtain a 3,3,3-trichloro-2-methyl-2-nitropropanol melting at 191°–192° C. A mixture of the product thus obtained with the product obtained as described in Example 1 gave no depression of the melting point.

*Example 3*

In a manner similar to that described in Example 1, the following 3,3,3-trichloro-2-alkyl-2-nitropropanols are prepared:

3,3,3-trichloro-2-ethyl-2-nitropropanol by the reaction of 3,3-dichloro-2-ethylallyl alcohol with dinitrogen tetroxide.

3,3,3-trichloro-2-(normal-propyl)-2-nitropropanol by the reaction of 3,3-dichloro-2-(normal-propyl)allyl alcohol with dinitrogen tetroxide.

3,3,3-trichloro-2-(normal butyl)-2-nitropropanol by the reaction of 3,3-dichloro-2-(normal butyl)allyl alcohol with dinitrogen tetroxide.

*Example 4*

In a manner similar to that described in Example 2, the nitroalcohols of Example 3 may be prepared by employing nitric acid in place of dinitrogen tetroxide.

3,3,3-trichloro-2-methyl-2-nitropropanol is useful in germicidal preparation for the control of bacterial and fungal organisms such as *Aerobacter aerogenes*, *Erwinia carotovora*, *Salmonella typhosa*, *Staphylococcus aureus*, *Aspergillus terreus*, *Penicillium digitatum* and *Rhizopus nigricans*. It is also useful in agricultural applications such as for the control of nematodes, *Meloidogyne* species.

It is also useful as herbicides, particularly aquatic herbicides for the control of submerged and floating aquatic weeds. In a representative operation for its use as aquatic herbicide, substantially complete controls of aquatic weeds, *Ancharis* sp., *Cahomba caroliniana*, *Lysimastrum nummularia* and *Solvinia rotundifolia* were obtained when the weeds were contacted with an aqueous dispersion of 3,3,3-trichloro-2-methyl-2-nitropropanol at a concentration of 10 parts per million parts of dispersion for a period of 24 hours.

The 3,3-dichloro-2-alkylallyl alcohol employed as starting materials may be prepared by the alkaline hydrolysis of 1,1,3-trichloro-2-akyl-1-propene. The preparation may be carried out by heating together in excess water, equimolar proportions of 1,1,3-trichloro-2-alkyl-1-propene and sodium hydroxide with stirring until the solution is neutral to litmus. After completion of the heating, the organic and aqueous layers may be separated and the organic layer fractionally distilled to obtain the 3,3-dichloro-2-alkylallyl alcohol.

The 1,1,3-trichloro-2-alkyl-1-propene may be prepared by the rearrangement of 1,1,1-trichloro-2-alkyl-2-propene in the presence of a catalyst such as thionyl chloride.

We claim:

1. A method for preparing 3,3,3-trichloro-2-alkyl-2-nitropropanol having the formula

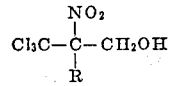

wherein R is a lower alkyl radical containing from 1 to 4 carbon atoms, inclusive, which comprises intimately mixing together 3,3-dichloro-2-alkylallyl alcohol and a nitrogen oxide oxidizing agent, said nitrogen oxide oxidizing agent being selected from the group consisting of dinitrogen tetroxide and nitric acid.

2. A method for preparing 3,3,3-trichloro-2-alkyl-2-nitropropanol having the formula

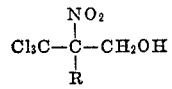

wherein R is a lower alkyl radical containing from 1 to 4 carbon atoms, inclusive, which comprises intimately mixing substantially equimolar proportions of 3,3-dichloro-2-alkylallyl alcohol and dinitrogen tetroxide in a temperature range of from −50° C. to 30° C.

3. A method for preparing 3,3,3-trichloro-2-alkyl-2-nitropropanol having the formula

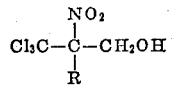

wherein R is a lower alkyl radical containing from 1 to 4 carbon atoms, inclusive, which comprises intimately mixing 3,3-dichloro-2-alkylallyl alcohol with excess nitric acid in the temperature range of from about −10° C. to 30° C.

4. 3,3,3-trichloro-2-methyl-2-nitropropanol having the formula

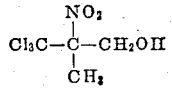

References Cited in the file of this patent
UNITED STATES PATENTS 2,844,538     Krug et al.     July 22, 1958